United States Patent
Malsbenden et al.

(10) Patent No.: US 8,738,542 B2
(45) Date of Patent: May 27, 2014

(54) METHOD AND SYSTEM FOR INDICATING PRODUCT RETURN INFORMATION

(75) Inventors: Francis A. Malsbenden, Greenwich, CT (US); Praveen Aravamudham, Nashua, NH (US)

(73) Assignee: Columbia Insurance Company, Omaha, NE (US)

( * ) Notice: Subject to any disclaimer, the term of this patent is extended or adjusted under 35 U.S.C. 154(b) by 1422 days.

(21) Appl. No.: 11/829,588

(22) Filed: Jul. 27, 2007

(65) Prior Publication Data
US 2008/0027787 A1 Jan. 31, 2008

Related U.S. Application Data

(60) Provisional application No. 60/833,585, filed on Jul. 27, 2006, provisional application No. 60/833,583, filed on Jul. 27, 2006.

(51) Int. Cl.
G06Q 30/00 (2012.01)
G06Q 30/06 (2012.01)
G06Q 10/08 (2012.01)

(52) U.S. Cl.
CPC ........ G06Q 30/0631 (2013.01); *G06Q 30/0623* (2013.01); *G06Q 30/0643* (2013.01); *G06Q 10/0837* (2013.01); *G06Q 30/016* (2013.01)
USPC ............... 705/304; 705/26.1; 705/28; 705/39

(58) Field of Classification Search
None
See application file for complete search history.

(56) References Cited

U.S. PATENT DOCUMENTS

| | | | |
|---|---|---|---|
| 5,710,886 A | 1/1998 | Christensen et al. | 395/214 |
| 5,845,276 A | 12/1998 | Emerson et al. | 707/2 |
| 6,035,280 A | 3/2000 | Christensen | 705/14 |
| 6,405,203 B1 | 6/2002 | Collart | 707/10 |
| 6,453,420 B1 | 9/2002 | Collart | 713/201 |
| 6,567,786 B1 | 5/2003 | Bibelnieks et al. | 705/14 |
| 6,665,489 B2 | 12/2003 | Collart | 386/94 |
| 6,714,922 B1 * | 3/2004 | Sansone et al. | 705/406 |
| 6,970,826 B2 * | 11/2005 | Christensen et al. | 705/26.8 |
| 7,035,811 B2 | 4/2006 | Gorenstein | 705/10 |
| 7,240,026 B2 * | 7/2007 | Satchell et al. | 705/26.81 |
| 7,266,513 B2 * | 9/2007 | Chalmers et al. | 705/26 |
| 7,376,572 B2 * | 5/2008 | Siegel | 705/1.1 |

(Continued)

OTHER PUBLICATIONS

Kim, JongEun (2005). Understanding consumers' online shopping and purchasing behaviors. Ph.D. dissertation, Oklahoma State University, United States—Oklahoma.*

(Continued)

*Primary Examiner* — Gurkanwaljit Singh
(74) *Attorney, Agent, or Firm* — IP Attorneys Group, LLC

(57) ABSTRACT

The invention relates to a method and system for indicating customer information having a computer, software executing on the computer for assigning each customer of a plurality of customers a unique customer identifier, software executing on the computer for determining an overall score for each customer based on criteria selected from the group consisting of a recent product purchase score, a frequency score, a monetary score, and combinations thereof, and software executing on the computer for displaying a plurality of indicators, each indicator representing a level of return for a product. The invention also includes a gauge directed to at least one indicator of the plurality of indicators, software executing on the computer for calculating returns for the product, and software executing on the computer for automatically adjusting the gauge based on the calculated returns for the product.

12 Claims, 10 Drawing Sheets

(56) References Cited

U.S. PATENT DOCUMENTS

| | | | |
|---|---|---|---|
| 7,455,226 B1* | 11/2008 | Hammond et al. | 235/385 |
| 7,580,860 B2* | 8/2009 | Junger | 705/22 |
| 7,660,721 B2* | 2/2010 | Williams et al. | 705/330 |
| 7,676,400 B1* | 3/2010 | Dillon | 705/26.7 |
| 7,797,164 B2* | 9/2010 | Junger et al. | 705/304 |
| 2001/0037207 A1* | 11/2001 | Dejaeger | 705/1 |
| 2002/0032612 A1* | 3/2002 | Williams et al. | 705/26 |
| 2004/0128265 A1* | 7/2004 | Holtz et al. | 705/406 |
| 2004/0172260 A1* | 9/2004 | Junger et al. | 705/1 |
| 2004/0260608 A1* | 12/2004 | Lewis et al. | 705/14 |
| 2005/0165647 A1* | 7/2005 | Razumov | 705/26 |
| 2006/0149577 A1* | 7/2006 | Stashluk et al. | 705/1 |
| 2006/0235746 A1* | 10/2006 | Hammond et al. | 705/14 |
| 2006/0242011 A1* | 10/2006 | Bell et al. | 705/14 |
| 2007/0011089 A1* | 1/2007 | DeSchryver | 705/39 |

OTHER PUBLICATIONS

Alan D Smith. (2005). Reverse logistics programs: gauging their effects on CRM and online behavior. VINE, 35(3), 166-181.*

Jai Ganesh. (2004). Managing customer preferences in a multi-channel environment using Web services. International Journal of Retail & Distribution Management, 32(2/3), 140-146.*

* cited by examiner

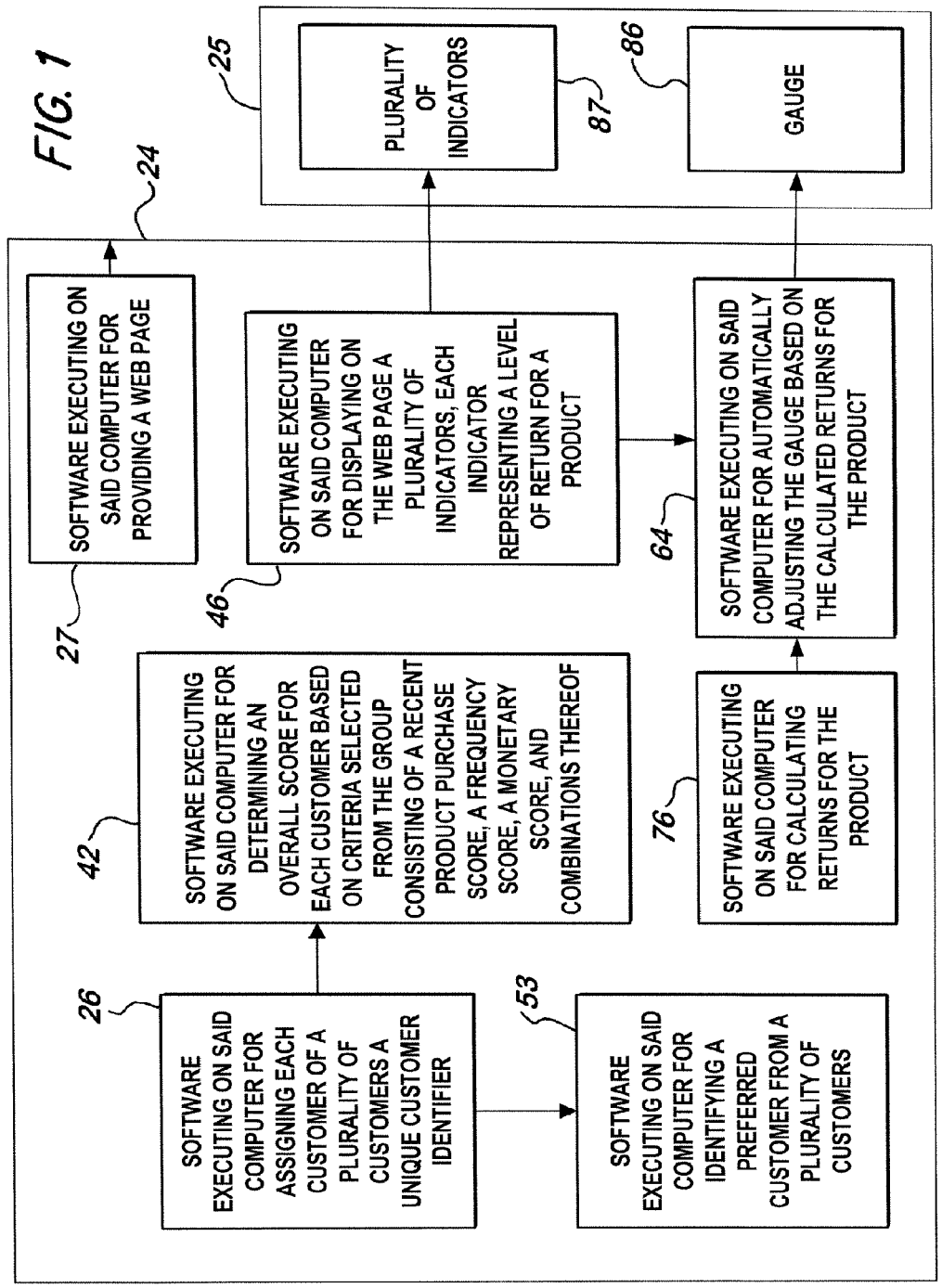

FIG. 5

Shoeline Support – (Shoeline Support Login)      Microphone   Tools   Handwriting Run   Collect   View   Tools   Window   Help frmrRFMView : Form

RFM Customers to Call

| | 1 of 34 |
|---|---|
| E-mail | padindjesky@yahoo.com |
| Phone | 203-555-1212 |
| | Next Email |
| | HELP |

Bill to:
- Company: NA
- Bill Name: Kate | Ellsworth
- Address: 446 Shadyglen Drive
- NA
- San Dimas | CA | 99756

Order ID: 223847
SLC Order: SLC223847
Time: 2/20/2006 10:06:07PM
Send EDI Date: 2/21/2006 10:36PM Ship to:
- Company: NA
- Bill Name: Kate | Ellsworth
- Address: 446 Shadyglen Drive
- NA
- San Dimas | CA | 99756
- Phone: 203-555-1212

This customer is located in PST, please make your call between 8PM and 9PM.

First Purchased: 12/3/2006
Frequency Score: 1
Recency Score: 1
Monetary Score: 1
Overall score: 3

LINE ITEMS

Http://www.shoeline.com/asp/dcpitemspider.asp?style=DW4218

*FIG. 6*

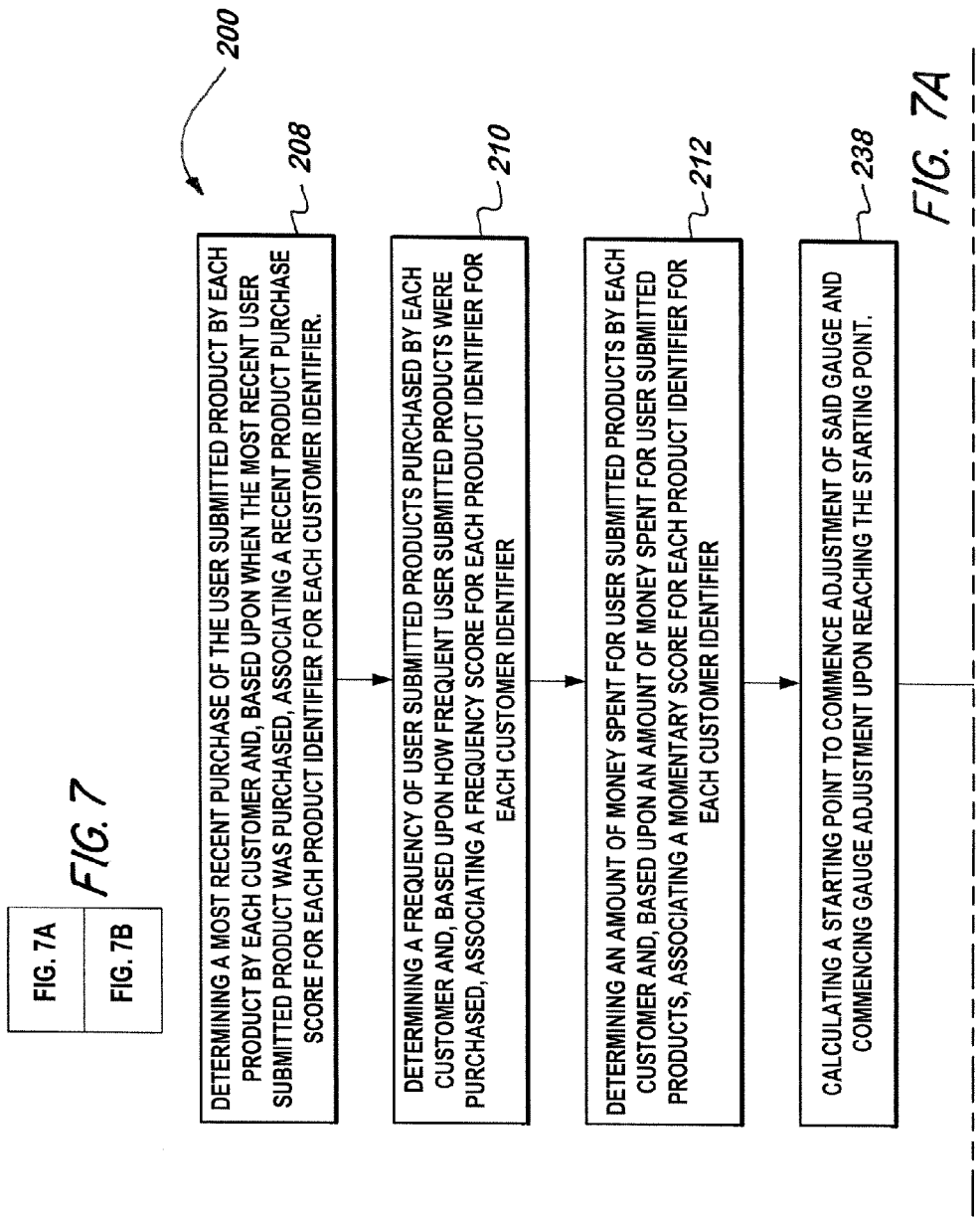

METHOD AND SYSTEM FOR INDICATING PRODUCT RETURN INFORMATION

CROSS-REFERENCE TO RELATED APPLICATIONS

This application claims the benefit under 35 U.S.C. §119(e) of U.S. Provisional Patent Applications Nos. 60/833,585, filed on Jul. 27, 2006 and 60/833,583, filed on Jul. 27, 2006, the content of which are incorporated herein by reference.

FIELD OF THE INVENTION

The invention relates to a method and system for indicating, sorting, and tracking customer information.

BACKGROUND OF THE INVENTION

A consumer may use the internet for a variety of reasons, such as shopping for items or reviewing items before making a purchase. The consumer may also use the internet to compare items from various competitors or stores as well as peruse reviews of certain items.

Although reviews and comments about a product may be available, this information is typically subjective and may not represent the views of a vast majority of people. Moreover, if a consumer has a bad buying experience, such as lengthy delays in obtaining the product or the consumer discovers the price he/she paid was more than if the product was purchased elsewhere, the consumer writing the review may negatively describe the product because of the bad buying experience even though the product may be satisfactory. In view of these scenarios, the reviews and other information about the product may not be helpful because other factors besides the product itself influence the consumers.

In addition to the consumer seeking information about the product and possibly the merchant, the merchant may also want information about the consumer, especially consumers likely to make purchases from the merchant. However, although the Internet usually allows consumers access to a wealth of information concerning products or services they are considering purchasing, the reverse is often not as easy. One way for a merchant to get information of a consumer is if the consumer writes a review or submits a comment to the merchant. However, without such an affirmative act by the consumer, the merchant often knows little if anything of its customer and even less of potential customers, particularly potential consumers who did not write a review or submit a comment. Because merchants and manufacturers typically lack sufficient information about consumers' likes and dislikes, it may be difficult to direct advertisements to the individuals likely to be interested or to make purchases.

Additionally, even if a consumer is interested in a product and this interest may be somehow calculated, websites often lack the ability to follow-through with the consumer to encourage the consumer to purchase a product or service. In a traditional brick and mortar store, a salesperson may be available to observe an interested customer and assist the customers with samples or answer any questions. In an internet or website setting, merchants typically lack the salesperson to observe any interested customers or to follow-through with them.

What is desired, therefore, is a system that identifies potential consumers to a product supplier. Another desire is a system that gives the product supplier an indication of the potential consumers so that the product supplier can send targeted information to these consumers. A further desire is a system that identifies potential consumers without the consumers needing to make any affirmative action in order to be identified as potential consumers. Yet another desire is system that provides objective information about a product. Still another object is a system that follows through with interested customers to enhance sales.

SUMMARY OF THE INVENTION

It is therefore an object of the invention to provide which identifies a list of preferred customers or potential customers for each product offered by a merchant without needing input on the part of the customers.

Another object is a system that automatically gives objective return information to a customer without user intervention.

A further object is a system that sends promotions to the preferred or potential customers.

These and other objects of the invention are achieved by a system for indicating customer information for a plurality of customers having a computer, a webpage for displaying a plurality of products available for purchase, and software executing on the computer for displaying on the webpage a plurality of indicators, each indicator representing a level of return for a product. The invention also includes a gauge directed to at least one indicator of the plurality of indicators, software executing on the computer for calculating returns for the product, and software executing on the computer for automatically adjusting the gauge based on the calculated returns for the product. The system further includes software executing on the computer for determining an overall score for each customer based on criteria selected from the group consisting of a recent product purchase score, a frequency score, a monetary score, and combinations thereof, wherein the software for determining the overall score operates in a back-end of the webpage.

In some embodiments, the system includes software executing on the computer for identifying a preferred customer from the plurality of customers. In other embodiments, the invention has software executing on the computer for calculating a starting point to commence adjustment of the gauge and commencing gauge adjustment upon reaching the starting point.

In further embodiments, the system also includes software executing on the computer for determining a most recent purchase of the user submitted product by each customer and, based upon when the most recent user submitted product was purchased, associating a recent product purchase score for each customer identifier; software executing on the computer for determining a frequency of user submitted products purchased by each customer and, based upon how frequent user submitted products were purchased, associating a frequency score for each customer identifier; and software executing on the computer for determining an amount of money spent for user submitted products by each customer and, based upon an amount of money spent for user submitted products, associating a monetary score for each customer identifier.

In some of these embodiments, the system also updates the overall score for each customer based upon an additional user submitted product transacted. In yet further embodiments, the system sorts a plurality of customers according to the overall score for each customer identifier.

In another aspect of the invention, a system for indicating customer information for a plurality of customers includes a computer, software executing on the computer for assigning each customer of a plurality of customers a unique customer identifier, software executing on the computer for retrieving a product identifier from a plurality of product identifiers based on a user submitted product to be transacted. The invention also has software executing on the computer for determining a most recent purchase of the user submitted product by each customer and, based upon when the most recent user submitted product was purchased, associating a recent product purchase score for each product identifier for each customer identifier, software executing on the computer for determining a frequency of user submitted products purchased by each customer and, based upon how frequent user submitted products were purchased, associating a frequency score for each product identifier for each customer identifier; software executing on the computer for determining an amount of money spent for user submitted products by each customer and, based upon an amount of money spent for user submitted products, associating a monetary score for each product identifier for each customer identifier; and software executing on the computer for determining an overall score for each user submitted product for each customer based upon the recent product purchase score, frequency score, and monetary score.

In some embodiments, the system includes software executing on the computer for storing the overall score with each customer identifier each time the overall score is determined.

In other embodiments, the system stores the recency score with each customer identifier each time the recency score is determined. In further embodiments, the system stores the frequency and/or monetary score with each customer identifier each time the frequency and/or monetary score is determined.

In another embodiment, the system updates the overall score for each customer based upon an additional user submitted product transacted. In yet another embodiment, the system includes software executing on the computer for sorting a plurality of customers according to the overall score for each product identifier and/or software executing on the computer for sending a promotion to a select number of customers of the plurality of customers based upon the overall score for each product identifier.

In further embodiments, the system has software executing on the computer for contacting each customer of the sorted plurality of customers. In some of these embodiments, the system tracks purchases made by the contacted customers.

In another aspect of the invention, a system for indicating customer information for a plurality of customers includes a computer; software executing on the computer for displaying a plurality of indicators, each indicator representing a level of return for a product; a gauge directed to at least one indicator of the plurality of indicators; software executing on the computer for calculating returns for the product; and software executing on the computer for automatically adjusting the gauge based on the calculated returns for the product.

In some embodiments, the system has software executing on the computer for directing the gauge to at least another indicator of the plurality of indicators based on the calculated returns. In some of these embodiments, software executes on the computer for incorporating reasons for returns, number of returns for each reason, and percentage of returns for each product of a plurality of products into the calculated returns.

In other embodiments, the system includes software executing on the computer for calculating a starting point to commence adjustment of the gauge and commencing gauge adjustment upon reaching the starting point.

In another aspect of the invention, a method for indicating customer information for a plurality of customers includes the steps of assigning each customer of a plurality of customers a unique customer identifier and retrieving a product identifier from a plurality from a plurality of product identifiers based on a user submitted product to be transacted. The method also includes determining a most recent purchase of the user submitted product by each customer and, based upon when the most recent user submitted product was purchased, associating a recent product purchase score for each product identifier for each customer identifier; determining a frequency of user submitted products purchased by each customer and, based upon how frequent user submitted products were purchased, associating a frequency score for each product identifier for each customer identifier; determining an amount of money spent for user submitted products by each customer and, based upon an amount of money spent for user submitted products, associating a monetary score for each product identifier for each customer identifier; and determining an overall score for each user submitted product for each customer based upon the recent product purchase score, frequency score, and monetary score.

In some embodiments, the method displays a plurality of products available for purchase on a webpage and displays on the webpage a plurality of indicators, each indicator representing a level of return for a product. Moreover, the method directs a gauge to at least one indicator of the plurality of indicators; calculates returns for the product; and automatically adjusts the gauge based on the calculated returns for the product.

In other embodiments, the method includes identifying a preferred customer from the plurality of customers. In further embodiments, the method calculates a starting point to commence adjustment of said gauge, commences gauge adjustment upon reaching the starting point, and updates the overall score for each customer based upon an additional user submitted product transacted. In another embodiment, the method sorts the plurality of customers according to the overall score for each product.

BRIEF DESCRIPTION OF THE DRAWINGS

FIG. 1 depicts the system in accordance with the invention.

FIG. 5 depicts an example of the webpage shown in FIG. 1.

FIG. 6 depicts an example of the computer shown in FIG. 1.

DETAILED DESCRIPTION OF THE INVENTION

Figure 2A:
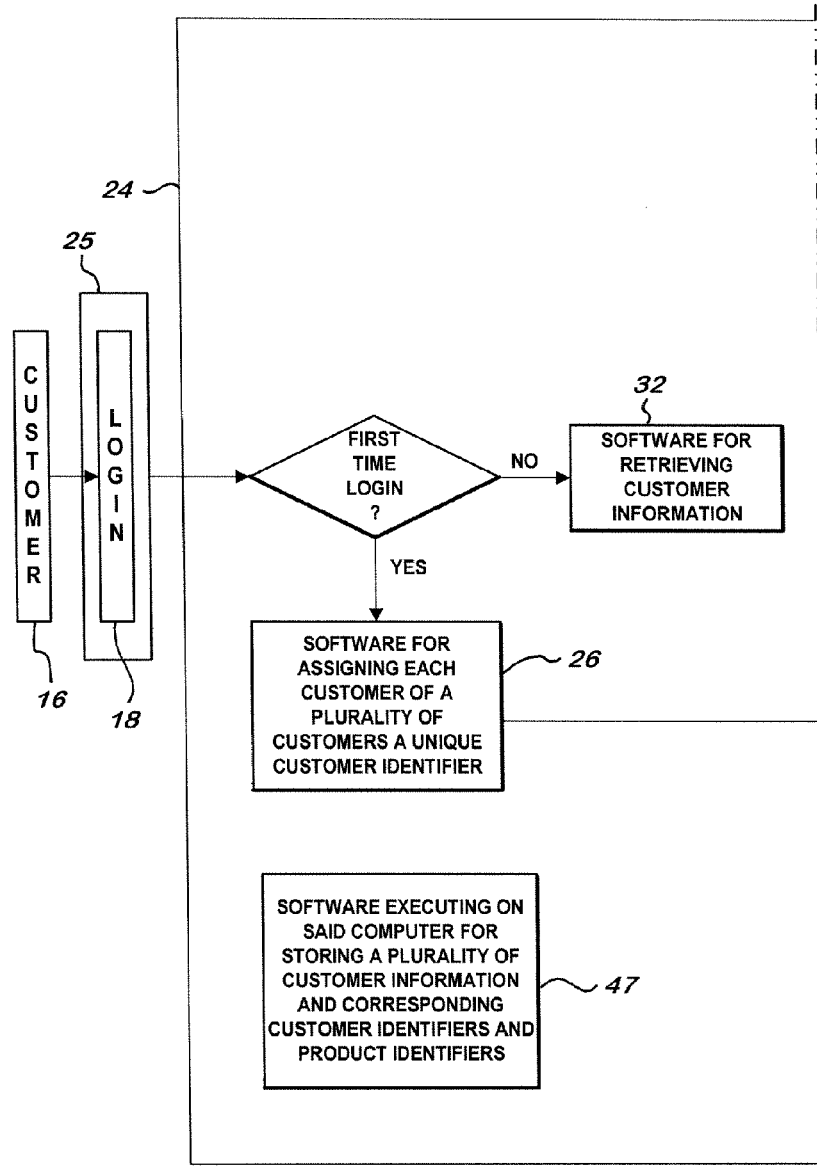
FIG. 2 more particularly depicts the computer shown in FIG. 1.

FIG. 1 depicts system 4 for indicating customer information in accordance with the invention, including computer 24 where various back-end programming is performed/run and webpage 27 where a user would see and submit information.

Computer 24 includes software 27 executing thereon for providing webpage 25 and software 26 executing on the computer for assigning each logged in customer of a plurality of customers a unique customer identifier, where the customer identifier is used for identifying a particular customer and where each customer identifier is different from a next customer identifier.

Once assigned a customer identifier, software 42 determines an overall score for each customer based on criteria selected from the group consisting of a recent product purchase score, a frequency score, a monetary score, and combinations thereof. In some embodiments, software 48 associates the overall score as well as combinations of recent product purchase score, frequency score, and monetary score with the customer identifier which indicates the particular customer. In some of these embodiments, software 48 further associates the above listed scores with the particular product to be transacted. Once associated, software 47 executing on the computer stores each score and other customer information with each customer identifier and product identifier.

Based on the above listed scores, software 53 identifies a preferred customer from the plurality of customers, which are usually at the top of the list with the best overall scores However, as described herein, overall scores are determined in a variety of ways by defining product. Computer 24 permits a user (such as an administrator or owner of computer 24) to define the product at any time, regardless of whether or not a customer already entered customer information that is stored on database 21.

In the case where customer information is already saved on database 21, where a particular product identifier is saved with the customer identifier and RFM score, computer 24 permits a new definition of product to be made, in which case a new product identifier is generated by software 89 and customer information for all customers are then retrieved and assigned a new RFM score based on the new product identifier. In this manner, many reports may be generated, depending upon what type of product is defined.

For example, for a customer purchasing a high heel shoe in patent leather where the product is defined as "heeled shoes" will have a first RFM score saved with a first product identifier and customer identifier on database. At a later time, when an administrator wants to know the preferred customers for patent leather shoes, computer 24 gathers all customer information for all customers stored on database 21 and generates, by using all of the existing software described herein, to generate a second product identifier for the product "patent leather shoe", generate a second RFM score for this second product identifier, and sort the list as well as save such scores and product identifiers with the corresponding customer identifier. Note the customer identifier need not be regenerated like the product identifier or RFM score with each newly defined product.

In addition to the foregoing, computer 24 also includes software 46 for displaying a plurality of indicators on a webpage, where each indicator represents a level of return for a product. In this fashion, and especially the result of software 64 for adjusting a gauge based on calculated returns, a customer has an idea of how often a product is or is not returned, where some customers find such information helpful in making a purchase decision. For example, a low return product or a high return product may be objectively indicated by computer 24 and software 64 and the customer may find such information useful when deciding whether or not to purchase the product.

In a further embodiment, a gauge points to the indicator of the plurality of indicators for indicating the level of return for the particular product without influence from any customer reviews or other outside sources. As shown, the gauge points to the indicator which shows the level of return, whether high or low, for the product. Hence, the gauge is objective and is a function of the calculated returns of the product.

In another embodiment, the gauge is a bar on a bar graph and the bar moves over the plurality of indicators. In some of these embodiments, the gauge is a lighted part of the bar graph that lights up the particular indicator that represents return information. In another embodiment, the plurality of indicators is a pie chart.

In addition, software 76 calculates returns for the product and software 78 for automatically adjusting the gauge based on the calculated returns for the product.

Figure 2:
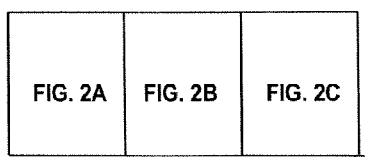
Figure 2B:
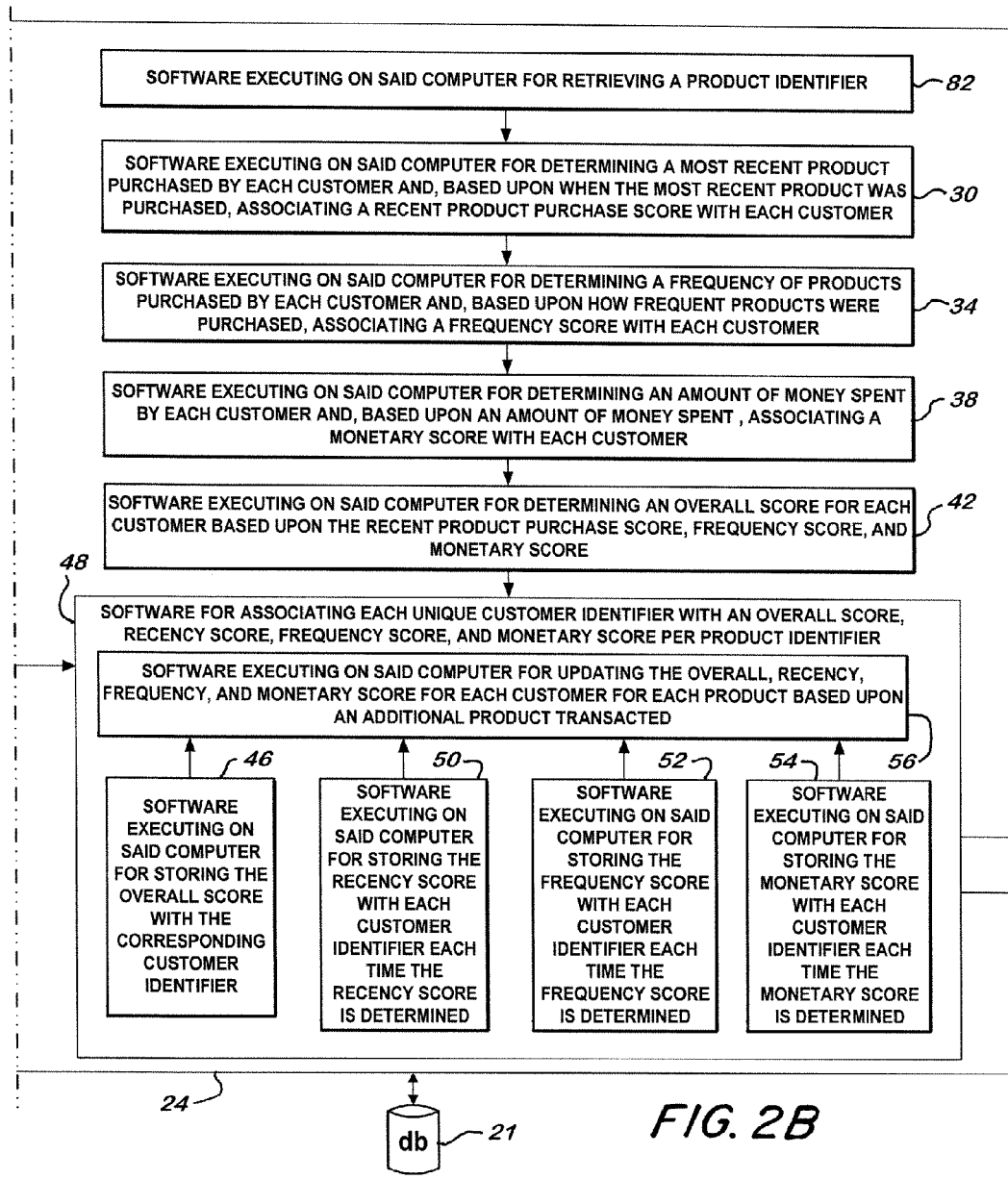
Figure 2C:
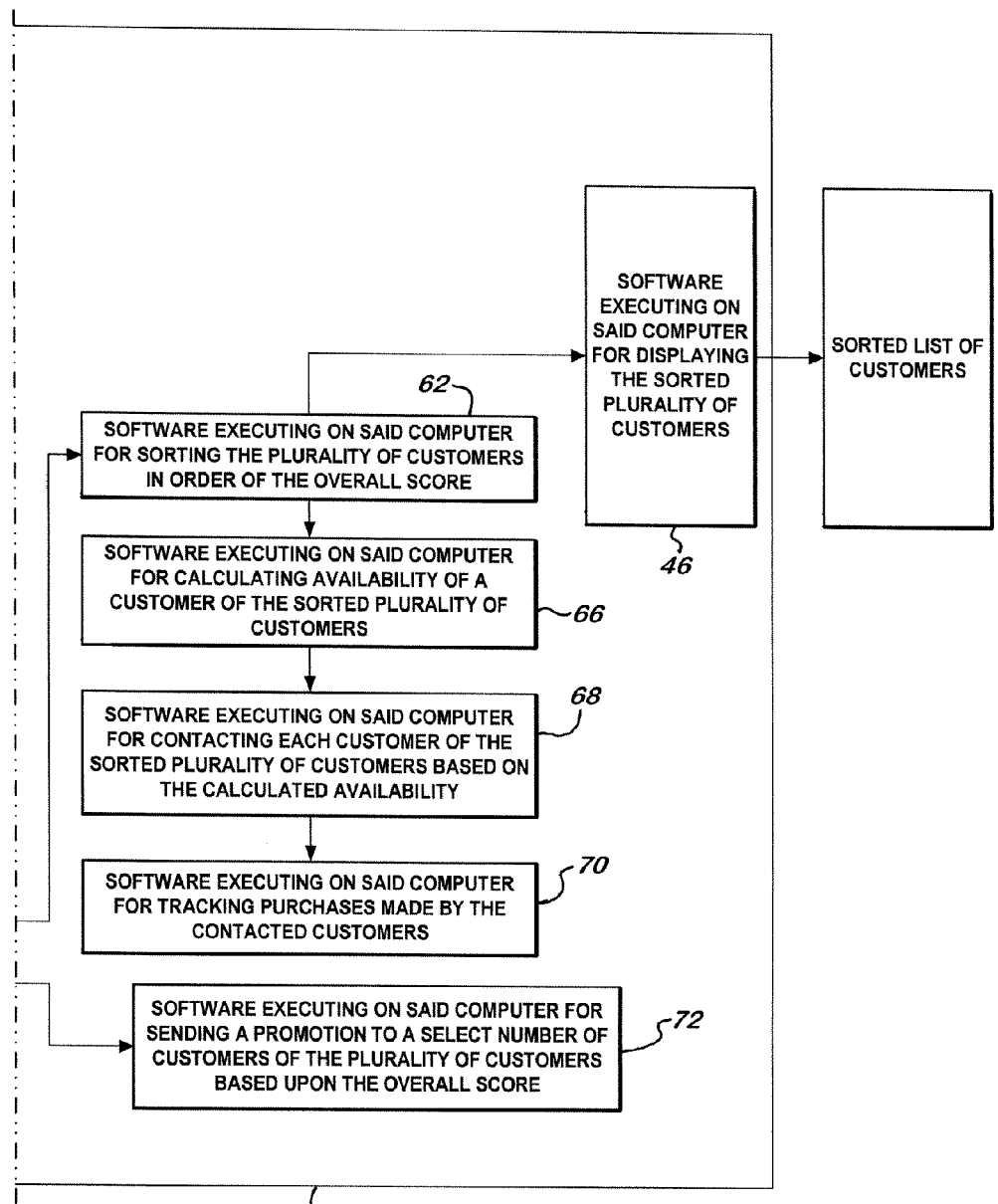

FIG. 2 more particularly depicts computer 24, including computer 24 and, after receiving a successful customer login 18 from customer 16, software 32 retrieves customer information from database 21, where the customer information is anything associated with customer 16, such as customer identifier, past purchases, past returns, past reviews, other historical transactions, and the like. In the event of a first time login, software 26 executing on the computer for assigning each customer a unique customer identifier generates a customer identifier and associates it with the customer. The unique identifier is generated similar to a password or passkey, such as a randomized alphabetic, numeric, or alphanumeric password. For multiple customers, software 26 for assigning each customer a unique identifier does so for a plurality of customers, where each customer is assigned a unique customer identifier.

Upon a subsequent purchase, return, exchange, or other transaction by customer 16 after login, each transaction is associated with the customer's unique identifier and stored on database 21. In the event of a purchase, a series of scores are calculated and associated with customer 16 in order to quantify the customer's buying habits, and these scores are also associated with each customer identifier and stored on database 21. In some embodiments, in the event of an exchange or return, the series of scores are calculated and associated with customer 16 in order to quantify the customer's exchange or return habits, and these scores are also associated with each customer identifier and each product identifier before being stored on database 21. In addition, in some embodiments, each score is further based on the type of product purchased, returned, or exchanged.

If a customer makes a return of a product, a reverse calculation is performed, where the recent product purchase score, frequency score, and monetary score are each recalculated as if the returned product was never purchased. Moreover, the overall score is recalculated to reflect the returned product.

For an exchange, the scores should not be affected unless the exchange was for a product of different value, in which case an increase or decrease in value between the exchanged products would affect the monetary score and overall score similar to a return and/or purchase of a product equivalent to the increase or decrease. The recent product purchase score and frequency score should not be affected by an exchange.

A goal of system 4 is to identify a preferred customer from a plurality of customers based on how recent the customer made a purchase, how frequent the customer makes purchases, and the total amount of money the customer spent in the past for each type of product. FIG. 6 depicts an example of such a preferred customer along with the customer's recency, frequency, monetary, and overall scores. In addition, in relation to software 68 for contacting each customer of the sorted plurality of customers, other customer information is depicted along with the scores so that contact with the customer is facilitated, such as the customer's identification and contact information.

Computer 24 includes software 82 for retrieving a product identifier from a plurality of product identifiers stored on database 21 and where the retrieved product identifier is based on a product to be transacted, and where the product to be transacted is user submitted or submitted by the user subsequent to login.

In some embodiments, the plurality of product identifiers are commensurate with the range of products available from a seller, where each product is identified by a product identifier, such as a numerical, alphabetical, or alphanumeric identification as opposed to a title or name of the product. In this fashion, each time customer 16 logs into computer 24, customer 16 needs to submit an identity of the product to be transacted on webpage 25, after which software 82 retrieves the corresponding product identifier for the user submitted product.

Once retrieved, computer 24 determines how recent the customer made a purchase with respect to a particular product indicated by the product identifier. Likewise, computer 24 can also determine how frequent the customer makes purchases of the particular product and the total amount the customer spent for each product.

In this fashion, and in some embodiments, the below described scores directed to recency, frequency, monetary, and overall are determined according to product. In some of these embodiments, customers are sorted according to any combination of these scores per product or per a combination of products. In other embodiments, customers are sorted according to the scores without regard to the product.

Computer 24 also includes software 30 executing on the computer for determining when a product was most recently purchased by each customer and, based upon when this occurred, assigning a recent product purchase score and associating this score with each customer via the customer identifier.

The more recent the purchase, the greater the likelihood the customer is likely to make another purchase. In some embodiments, a purchase within the last 30 days is assigned a score of 1, a purchase between the 30th and 60th days is assigned a score of 2, and so forth. Therefore, the best recent product purchase score that may be received is 1.

Computer 24 also includes software 34 executing on the computer for determining a frequency of purchases, or how often purchases are made, by customer 16. In some embodiments, software 34 tallies the total amount of product purchased per calendar year and assigns a score to customers based on how frequent purchases are made, such as a 1 for the top 20% of customers based on the frequency of that customer. In other embodiments, the frequency is based on the total number of products sold per month or other time period, such as per quarter year or per week.

The more frequent the purchases, the greater the likelihood the customer is likely to make another purchase. In some embodiments, a frequency in the top 20% is assigned a score of 1, a percentile between 21% and 40% is assigned a score of 2, and so forth. Therefore, the best frequency score that may be received is 1.

In further embodiments, the frequency score is calculated per product, which is particularly beneficial when comparing the frequency scores of products that tend to have vastly different purchasing patterns. For example, customers who purchase perishable goods may make, by the nature of the products as opposed to the behavior of the customer, more purchases on average than customers who purchase furniture. Therefore, comparing the frequency scores of both sets of customers, without distinguishing based on the product, would show the furniture customers to have low scores and, hence, not be candidates of being preferred customers when in fact the low scores are due to the industry or product wherein purchasing furniture is by its nature slower to move than shoes or perishable goods. As described more particularly below, the frequency score also affects an overall score, and without differentiating based on product, the overall score may not reflect purchasing habits that generally affect certain products and therefore the overall score may not be an accurate gauge of a customer's buying habits.

In some embodiments for one product, the frequency and monetary scores fluctuate more than the recency score. In another embodiment for another product, the recency and frequency scores fluctuate more than the monetary score. Because of this, targeted marketing becomes more guesswork than scientific, and can be dependent upon the type of product. To address this concern, computer 24 differentiates per product, and where some embodiments define a product narrowly. See the description under FIG. 4 for a definition of product.

Likewise, in some embodiments, the recency score is calculated per product for the same reasons above. In further embodiments, because recency and/or frequency scores are affected in some embodiments, the monetary score described below can also be affected and therefore the monetary score is calculated per product.

Computer 24 also includes software 38 executing on the computer for determining a total amount of money spent by each customer and, based upon this total amount, assigning a monetary score and associating this score with each customer.

The more money spent, the greater the likelihood the customer is likely to continue to make such expenditures. In some embodiments, more frequent purchases are weighted more heavily than a single purchase equal to the sum of all the frequent purchases. This is because the frequency indicates a repeat, and perhaps loyal, customer. In other embodiments, total amount spent, as opposed to frequency, is the focus. In either situation, software 38 tallies the total amount of spent per calendar year and assigns a monetary score to customers based on this total amount, such as a 1 for the top 20% of customers. In other embodiments, the monetary score is based on the total spent per month or other time period, such as per quarter year or per week.

In some embodiments, a monetary score in the top 20% is assigned a score of 1, a percentile between 21% and 40% is assigned a score of 2, and so forth. Therefore, the best monetary score that may be received is 1.

In further embodiments, the monetary score is calculated per product, which is particularly beneficial when comparing the monetary scores of products that tend to have vastly different purchasing patterns. Continuing with the example above with respect to the perishable goods and furniture, even though a frequent purchaser of the perishable goods may make consistent purchases of products, a single purchase of furniture is typically far more expensive than even numerous purchases of perishable goods. As a result, the single furniture purchase will have a significantly higher monetary score and this may further offset any unfavorable recency and/or frequency score. Because of this, the overall score of perishable goods, which may represent loyal and consistent consumers, may be lower than a person making a single purchase of an expensive piece of furniture.

Hence, a comparison of the overall scores alone, and likewise any combination of recency, frequency, and monetary scores, without regard to product would not give an accurate indication of which customer purchased more product recently, purchased more frequently, and/or spent more on purchases.

Each recent product score, frequency score, and/or monetary score is saved with the corresponding customer identifier on database 21. In some embodiments, the invention saves lists of customers, sorted by any one or combination of the above generated scores. In this fashion, reports may be generated using these lists, which are used as a tool to track customers' histories and to forecast future purchases.

In another embodiment, after computation of the recency, frequency, and monetary scores, software 42 executing on the computer determines an overall score for each customer based upon the recency score, frequency score, and monetary score. In some embodiments, the computation is simply adding the three scores together. In other embodiments, one score is weighted more heavily than the other scores prior to averaging the three. All that is required is for the overall score to reflect the behavior patterns of each customer.

After calculating the overall score per product per customer, software 48 associates the overall score with the product (the user submitted product being transacted) and customer identifier to which it relates. In some embodiments, software 46 for storing the overall score with the corresponding customer identifier and product identifier saves them all together on database 21. In other embodiments, software 50 executing on the computer stores a recency score with each customer identifier and product identifier. In further embodiments, software 46 stores the frequency score with each customer identifier and product identifier. In yet other embodiments, software 54 stores the monetary score with each customer identifier and product identifier. In some of these embodiments, any combination of recency score, frequency score, monetary score, and overall score are stored on database by software 21 together with each customer identifier and each product identifier.

In another embodiment, computer 24 includes software 56 executing on the computer for updating the overall score on an automatic basis without user intervention. Optionally, software 56 updates the recency score, frequency score, monetary score, and combinations of these. In one embodiment, updating occurs each time a product is transacted, such as a purchase made by a customer of the plurality of customers, wherein the transaction (e.g. purchase) itself or confirmation of the transaction triggers software 56 to execute and update all of the scores associated with each customer identifier and each product identifier, including the overall score, recency score, frequency score, and monetary score. It is understood that the score(s) associated with each product for each customer are updated each time a customer makes a purchase without user intervention and in a manner that is seamless to the customer.

In another embodiment, updating is done systematically across the board for the entire plurality of customers based on time (e.g. weekly, monthly, etc.) and/or date (e.g. every 15th of the month) regardless of a purchase, return, exchange, and the like being made or not, in which case a customer who did not make any transactions will have the same overall score before and after the update is performed. In yet another embodiment, updating is done based per customer per product.

Computer 24 also includes software 62 for sorting the plurality of customers according to the overall score of each product identifier for each customer. In other embodiments, software 62 sorts the plurality of customers according to recency score, frequency score, monetary score, and combinations thereof per product and per customer.

After the plurality of customers are sorted, software 72 sends rewards or promotions to the customers at the top, or the preferred customers, of the sorted list by offering discounts or credit on future purchases, such as free upgrades, free shipping, and the like during the checkout process. In another embodiment, promotions are displayed on the webpage when the preferred customers login. In another embodiment, an email is sent to the preferred customers with a link directing the preferred customers to a webpage with a promotion. In the foregoing embodiments, it is understood software 72 sends any one of a variety of promotions, where the promotion selected by software 72 is dependent upon the overall score, recency score, frequency score, and/or monetary score. If ordering for the first time, the overall score, or rfm score, does not exist for the customer and, therefore, promotions based on rfm will not be available. A returning customer who has rfm score will see promotions based on the rfm score as set forth above.

In further embodiments, software 68 executing on the computer contacts some of the customers of the sorted plurality of customers. Contact is made by software 68 via email, recorded phone messages, text messages, mail, and the like. The method of contact, such as email, may further have a link to the webpage having the products available for purchase.

In one embodiment, as a way of ascertaining whether or not the act of contacting the customer has a positive effect on the sales of products after contact is made with the customer, software 70 tracks purchases made by the contacted customers. In some of these embodiments, comparisons are made between contacted and non-contacted customers to determine if the contacted customers have a higher percentage of purchasing again when compared with non-contacted customers. In another embodiment, follow up phone calls are made to the pool of recipients of the contacts made by software 68, wherein the follow up callers gather customer reaction and inputs his/her understanding of the customers' reactions. In further embodiments, the above comparisons made between contacted and non-contacted customers also take into account the understandings submitted by the follow up callers, wherein the understandings can support the positive or negative affects of the comparisons.

In other embodiments, a program saves the level of customer reaction inputted by the caller-employee. Another software generates a report detailing all calls, whether customers buy within a specified time period after the calls. That way the script can be changed for other callers who have less success. Also, which employee has the best success rate is known. In another embodiment, to reduce employee subjective opinions, level of customer reaction based on more objective characteristics, such as future sales within a specified time period after the call, customer replies to surveys, trend (whether future sale is of a product that is related to the phone call).reports can be daily, weekly, monthly, etc.

To further entice customers, new and old, to make purchases or additional purchases, software 72 for sending promotions is used for sending coupons, notification of a benefit, and the like to a select, or preferred, customer based on the above sorted list, which in turn is based on his/her overall or rfm score in comparison with other scores.

In some embodiments, notification or promotion is sent automatically via email based on recency score, frequency score, monetary score, and combinations thereof, where notification is a hyperlink to a special webpage with a unique password in the notification or email, and where each customer has a unique password and wherein submission of the unique password constitutes an identification or prompt to the invention that the preferred customer has logged on, at which point the promoted product may be purchased. In some embodiments, software 72 for sending promotions sends them to particular customers automatically without user intervention. In some of these embodiments, software 72 for sending promotions knows where to send the promotions based on cookies saved on the machines of customers, and where favorable RFM scores would prompt software 72 to send the promotions to customers with favorable RFM scores.

In another embodiment, a unique password is common among a class of customers, such as the class having an overall score of 3, where everyone in this class of customers receives the same notification or promotion. Another class has a different password, where this other password is directed to a different promoted product available for purchase. In some of these embodiments, the promotion directs the customer to a special webpage. Once at the special webpage, each customer needs to input his/her customer identifier and this acts as a double-check, or confirmation, that customer 16 is allowed entry to the special webpage.

In addition to the foregoing customer information includes the overall score being determined and saved each time with each customer identifier. In some embodiments, the customer identifier is a part of the customer information on database 21. Also, customer information includes the recency score, frequency score, and monetary score for each product.

Figure 3:
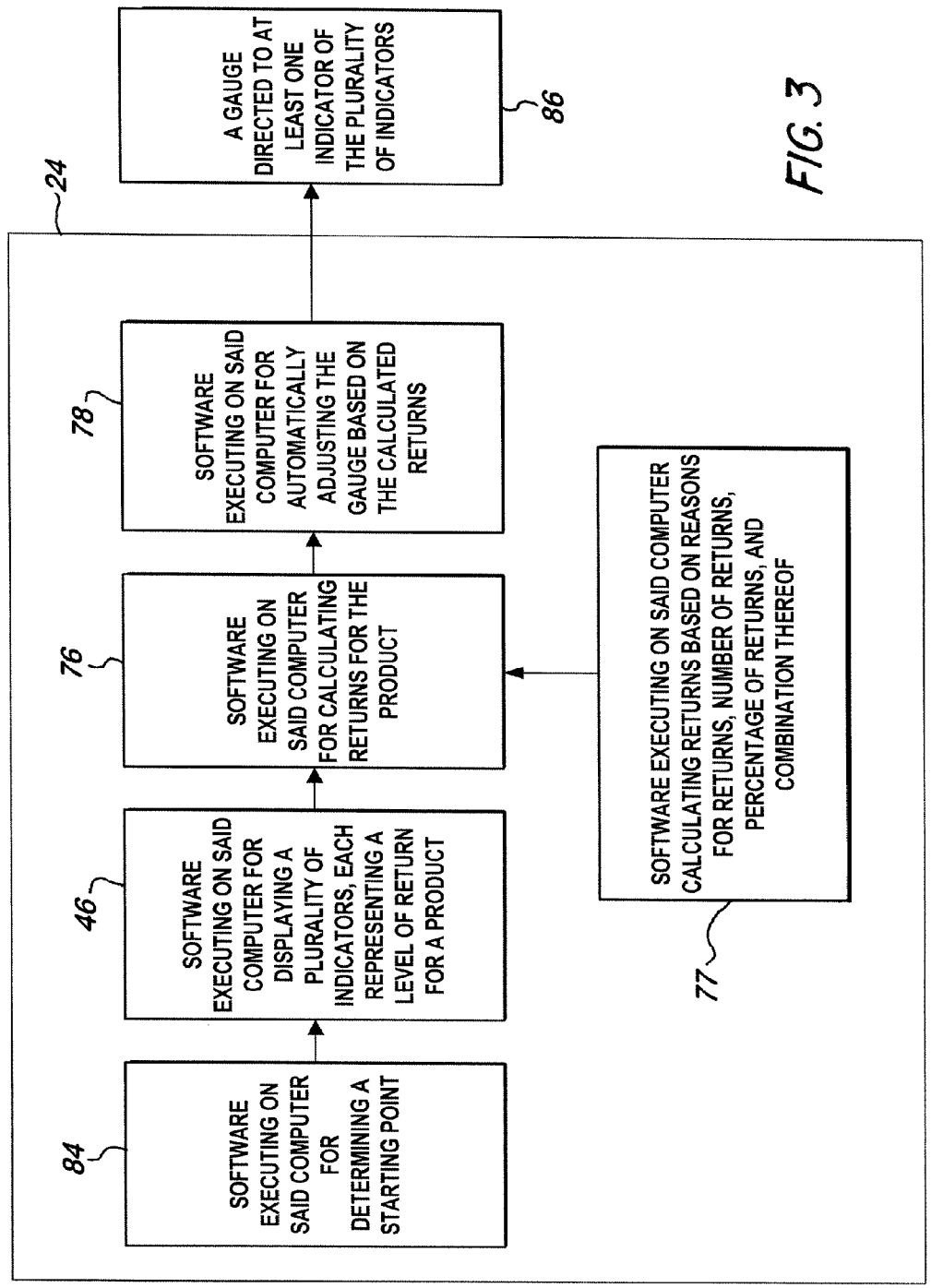
FIG. 3 more particularly depicts the computer shown in FIG. 1.
Figure 5:
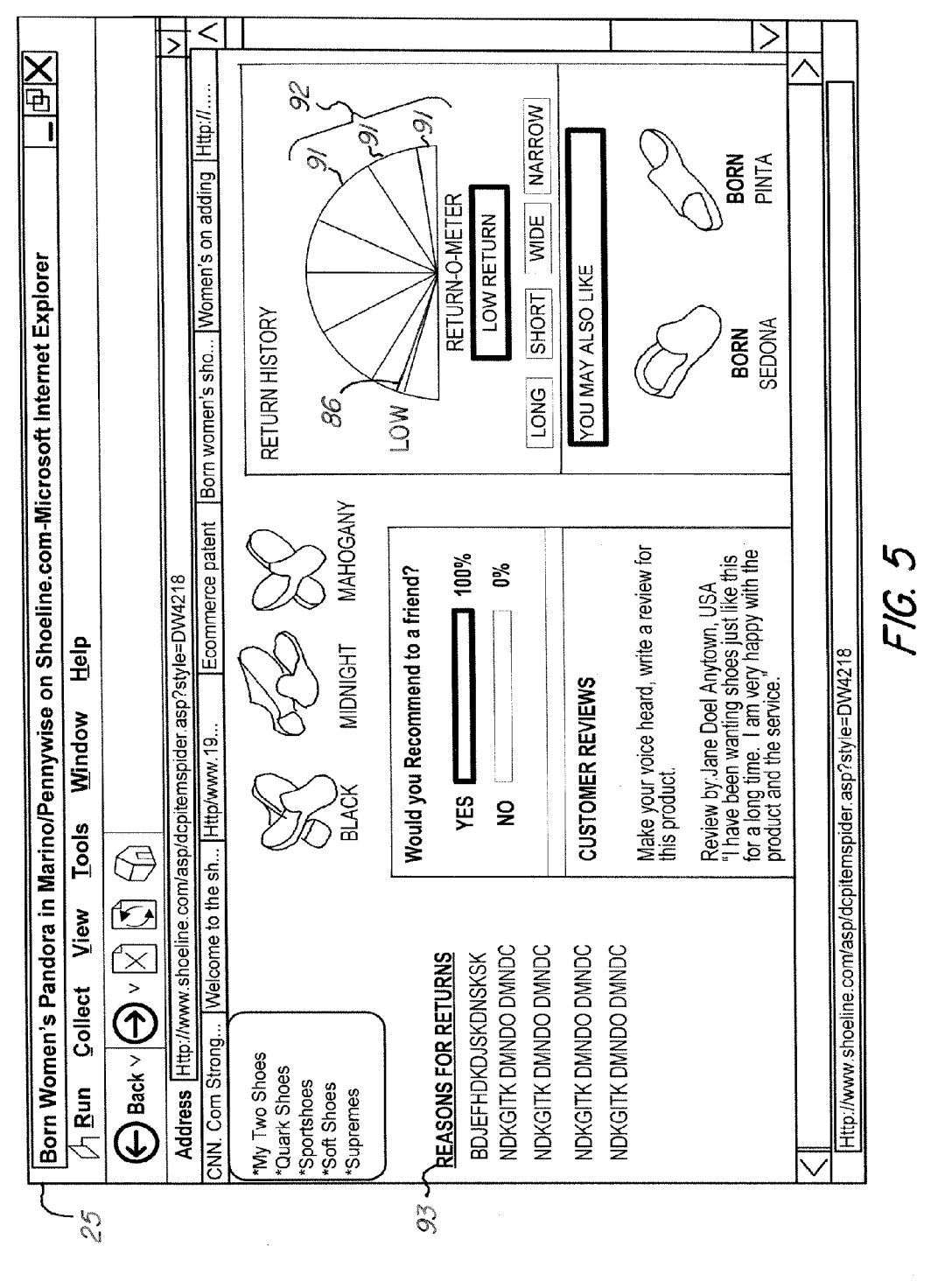

FIG. 3 more particularly depicts computer 24, including computer 24 and software 84 executing on the computer for determining a starting point, after which software 46 would then execute on the computer for displaying plurality 92 of indicators (see FIG. 5), each indicator 91 representing a level of return for a product. The starting point is an amount of returns for a product and the amount of returns is determined by the merchant. As described above, the frequency and price of products vary due to the nature of the products and not because of the products themselves. For example, food is usually purchased more often and costs less than furniture. Likewise, the level of returns should be expected to vary due to the nature of the products and not because of the products themselves. In this regard, a high level of returns for one product may mean the product is problematic whereas the same level of return for a different product may not necessarily mean the product is problematic. For example, the same furniture having a high return rate may indicate a problem with the furniture whereas a high return rate on shoes or clothing may not necessarily mean there are problems since wrong sizes and/or fit are usually the reasons given for returns on shoes and/or clothing.

Parameters for determining a starting point include consideration of an amount of products, where the amount is great enough so that the indicator fluctuates less than 15% when another product is purchased. In other embodiments, fluctuation is less than 10%. In further embodiments, fluctuation is less than 5%. In situations where there are 5 products sold, each product causes the indicator to fluctuate about 20%. Such indicator movement may not give a purchaser an accurate indication of returns, particularly if returns can be 40% one day and 20% the next. In other situations where 10 products are sold, each product causes the indicator to fluctuate 10%, which may or may not be unacceptable depending upon the product.

In some embodiments, software 76 for calculating returns will list the reasons, or the top reasons, along with plurality 92 of indicators so customers can see the reasons for a return rate of a product. Software 76 for calculating returns based on reasons for returns will obtain these reasons submitted by the customers making the returns through reviews or as a part of the return form that is filled out each time a return is made.

Software 76 for calculating return information and automatically adjusting the gauge executes without user intervention upon completion of a the product transaction, where a return would not only affect the overall score, but also affect the gauge location relative to the plurality of indicators. The plurality of indicators is any combination of colors, shapes, numbers, alphabets, designs, patterns, and the like.

In some embodiments, software 76 includes determining reasons for returns, number of returns, and the foregoing per product. In other embodiments, reasons 93 for returns are depicted along side plurality 92 of indicators to help the customer decide as to whether or not to purchase the product. As shown, the top three reasons are listed. In further embodiments, the top ten reasons are listed and each reason there is a percentage listed where the percentage indicates how many products were returned for the corresponding reason. In some embodiments, elapsed time or average of returns/purchases/exchanges are also listed next to reasons 93 for returns.

Gauge 86 points to a single indicator of plurality 87 of indicators. Gauge 86 is automatically adjusted by software 76 each time a return is completed, wherein software 76 for calculating the returns for a product simply averages the number of returns and directs gauge 86 to the applicable indicator 91 where plurality 92 of indicators are linearly related to one another.

Moreover, since computer 24 operates continuously in real time, every time a return is made that alters a position of gauge 86, software 78 for automatically adjusting the gauge based on the calculated returns directs gauge 86 to the applicable indicator, which may be another indicator based on the calculated returns.

Figure 4:
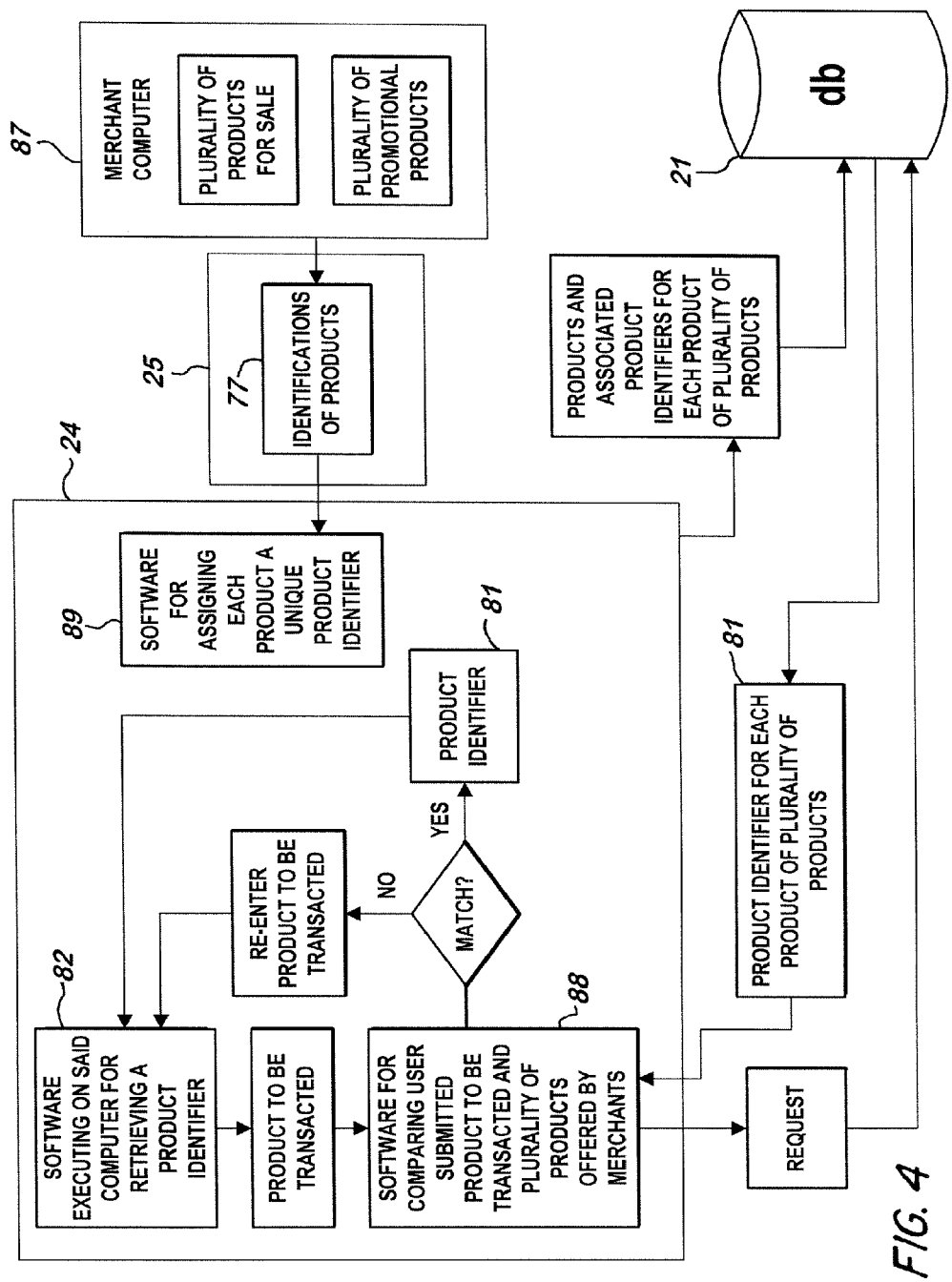
FIG. 4 more particularly depicts the computer and software for retrieving a product identifier shown in FIG. 2.

FIG. 4 more particularly depicts software 82 for retrieving a product identifier and how product identifier 81 is retrieved. As shown, a merchant stores all products for sale on merchant computer 87, including promotional and/or regular products for sale. In some embodiments, promotion and regular products for sale are the same where some regular items are used as a part of promotions. However, in other embodiments, the promotional products are different and not a part of regularly sold products.

Merchant computer 87 would then transmit identifications 77 of these products to computer 24, where software 89 for assigning each product a unique product identifier includes all of the same limitations as software 26 for assigning customer identifiers. Once each product is assigned and associated with a product identifier, all are stored on database 21.

Software 82 for retrieving the product identifier sends the user submitted product to be transacted (from the customer) to software 88 for comparing the user submitted product with identifications 77 of all products offered by the merchant. Software 88 for making the comparisons sends request 79 to database 21 for product identifiers 81, and upon receipt of product identifiers 81, software 88 commences the comparisons between each product identifier 81 and identifications 77 submitted by the merchant from database 21. Once a match between products is found, product identifier 81 is sent to software 82. If a match is not found, it means the merchant is not selling the user submitted product and the customer is asked to reenter the product to be transacted.

A product is defined to be any item sold by the merchant. In some embodiments, each product of the plurality of products for sale and/or promotional products includes any variation of a shoe. In other embodiments, a shoe available with both ankle straps or no straps at all would constitute two different products and would generate two different product identifiers. Likewise, a shoe available in two colors would constitute two different products and would generate two different product identifiers.

In this manner, RFM scores are calculated per product in as a narrow a manner as desired by computer 24. In one embodiment, these narrower definitions are defined as subcategories, such as shoes with or without ankle straps. In other embodiments, the product or subcategory is defined in accordance with gender, brand name, and the like.

In further embodiments, each product is determined according to a characteristic of the product. For example, in the area of shoes, a product is defined as casual, dress, sandals, and the like. Therefore, all purchases of sandals by a customer would belong to a single product even if each sandal varied in color, size, leather, brand name, and gender. In another example, all shoes with laces belong to a first product and all slip-on shoes belong to a second product. Therefore, all purchases of any shoe having laces and any shoe without laces would be a part of the first and second products, respectively. Further products are defined by the brand name and/or gender.

In this manner overall scores are calculated in any number of different ways depending upon how the product is defined. Further, it is possible that a shoe belonging to one product, such as a product with laces, also belongs to another product, such as a shoe belonging to a wing tip dress shoe. The overall score can be calculated for either lace up shoes or wing tip dress shoes (or simply dress shoes) or both.

In an exemplary embodiment, the below table shows the fields that are used when calculating a RFM score and depicted in another embodiment of FIG. 6.

| Field Name |
| --- |
| SeqNumber |
| Email |
| FirstPurchased |
| RecentPurchased |
| NumberPurchases |
| TotalPrice |
| CurrentDate |
| MonthsElapsed |
| WeeksElapsed |
| DaysElapsed |
| FreqCountCatSubCat |
| MonetaryCountCatSubCat |
| AverageFreqcatSubCat |
| AverageMonetarySubCat |
| MonetaryScoreCatSubCat |
| FrequencyScoreCatSubCat |
| RecencyScoreCatSubCat |
| OverallScoreCatSubCat |

In an exemplary embodiment, below are the algorithms used to calculate the frequency, monetary, and recency scores for a product, or an RFM score for a subcategory.

| Frequency/Monetary Calculation: |
| --- |
| Frequency is defined as the number of purchases made each week starting from the first purchase till today. The scores range from 1-5 with 1 - Top 20% and 5 - Bottom 20%. The different percentile ranges are calculated as follows:<br>Step 1 - The total frequency range for each customer is calculated initially in descending order of their range.<br>Step 2 - The sum of all these scores is taken and 0.20 * score is calculated to begin separating the scores into the percentile ranges<br>Step 3 - If a customers' frequency range lies between the (sum of all scores * 0.20) then the customer lies in the top 20 range and so on<br>Step 4 - After the Top 20 is calculated, the next percentile (21-40%) range is calculated by taking the last calculated value for the Top 20 percentile (Lower Range) and looped till the percentile range is completed<br>Step 5 - The same technique is applied for the remaining percentile ranges<br>SELECT @TotalScoreCount = SUM(FreqCount) FROM RFMBase<br>SET @Top20ScoreCount = @TotalScoreCount * 0.20<br>SET @Top40ScoreCount = @TotalScoreCount * 0.20<br>SET @Top60ScoreCount = @TotalScoreCount * 0.20<br>SET @Top80ScoreCount = @TotalScoreCount * 0.20<br>SET @InterScoreCount = 0<br>--Cursor for Top 0-20 Percent<br>DECLARE FrequencyScoreTop20_Cursor CURSOR FOR<br>SELECT Email, FreqCount FROM RFMBase Order By FreqCount DESC;<br>SELECT @PrevScore = MAX(FreqCount) FROM RFMBase<br>OPEN FrequencyScoreTop20_Cursor<br>FETCH FrequencyScoreTop20_Cursor INTO @Email, @FreqCount<br>WHILE @@FETCH_STATUS = 0<br>BEGIN<br>    SET @InterScoreCount = @InterScoreCount + @FreqCount<br>    IF (@InterScoreCount <= @Top20ScoreCount) OR (@FreqCount = @PrevScore)<br>    BEGIN<br>    UPDATE RFMBase<br>    Set FrequencyScore = 1 WHERE Email = @Email<br>    SET @PrevScore = @FreqCount<br>    END<br>FETCH FrequencyScoreTop20_Cursor INTO @Email, @FreqCount<br>END<br>SET @InterScoreCount = 0<br>CLOSE FrequencyScoreTop20_Cursor<br>DEALLOCATE FrequencyScoreTop20_Cursor<br>--Cursor for Top 20-40 Percent<br>DECLARE FrequencyScoreTop20to40_Cursor CURSOR FOR<br>SELECT Email, FreqCount FROM RFMBase WHERE FrequencyScore is NULL Order By FreqCount DESC;<br>SELECT @PrevScore = MAX(FreqCount) FROM RFMBase WHERE FrequencyScore is NULL<br>OPEN FrequencyScoreTop20to40_Cursor<br>FETCH FrequencyScoreTop20to40_Cursor INTO @Email, @FreqCount<br>WHILE @@FETCH_STATUS = 0 |

-continued

| Frequency/Monetary Calculation: |
|---|

```
BEGIN
SET @InterScoreCount = @InterScoreCount + @FreqCount
    IF (@InterScoreCount <= @Top40ScoreCount) OR (@FreqCount = @PrevScore)
    BEGIN
    UPDATE RFMBase
    Set FrequencyScore = 2 WHERE Email = @Email
    SET @PrevScore = @FreqCount
    END
FETCH FrequencyScoreTop20to40_Cursor INTO @Email, @FreqCount
END
SET @InterScoreCount = 0
CLOSE FrequencyScoreTop20to40_Cursor
DEALLOCATE FrequencyScoreTop20to40_Cursor
SET @InterScoreCount = 0
--Cursor for Top 40-60 Percent
DECLARE FrequencyScoreTop40to60_Cursor CURSOR FOR
SELECT Email, FreqCount FROM RFMBase WHERE FrequencyScore is NULL Order By
FreqCount DESC;
SELECT @PrevScore = MAX(FreqCount) FROM RFMBase WHERE FrequencyScore is NULL
OPEN FrequencyScoreTop40to60_Cursor
FETCH FrequencyScoreTop40to60_Cursor INTO @Email, @FreqCount
WHILE @@FETCH_STATUS = 0
BEGIN
SET @InterScoreCount = @InterScoreCount + @FreqCount
    IF (@InterScoreCount <= @Top60ScoreCount) OR (@FreqCount = @PrevScore)
    BEGIN
    UPDATE RFMBase
    Set FrequencyScore = 3 WHERE Email = @Email
    SET @PrevScore = @FreqCount
    END
FETCH FrequencyScoreTop40to60_Cursor INTO @Email, @FreqCount
END
SET @InterScoreCount = 0
CLOSE FrequencyScoreTop40to60_Cursor
DEALLOCATE FrequencyScoreTop40to60_Cursor
--Cursor for Top 60-80 Percent
DECLARE FrequencyScoreTop60to80_Cursor CURSOR FOR
SELECT Email, FreqCount FROM RFMBase WHERE FrequencyScore is NULL Order By
FreqCount DESC;
SELECT @PrevScore = MAX(FreqCount) FROM RFMBase WHERE FrequencyScore is NULL
OPEN FrequencyScoreTop60to80_Cursor
FETCH FrequencyScoreTop60to80_Cursor INTO @Email, @FreqCount
WHILE @@FETCH_STATUS = 0
BEGIN
SET @InterScoreCount = @InterScoreCount + @FreqCount
    IF (@InterScoreCount <= @Top80ScoreCount) OR (@FreqCount = @PrevScore)
    BEGIN
    UPDATE RFMBase
    Set FrequencyScore = 4 WHERE Email = @Email
    SET @PrevScore = @FreqCount
    END
FETCH FrequencyScoreTop60to80_Cursor INTO @Email, @FreqCount
END
SET @InterScoreCount = 0
CLOSE FrequencyScoreTop60to80_Cursor
DEALLOCATE FrequencyScoreTop60to80_Cursor
UPDATE RFMBase
SET FrequencyScore = 5 where FrequencyScore is NULL
Monetary Score:
Monetary score is defined by the total $$ spent on our site with scores ranging from 1-5 with 1
being the maximum and 5 being the minimum.
As In frequency score calculations, different percentile ranges are computed to place customers
in their respective scores. The concept is the same as in frequency score calculations, below is
the algorithm:
SELECT @TotalScoreCount = SUM(MonetaryCount) FROM RFMBase
SET @Top20ScoreCount = @TotalScoreCount * 0.20
SET @Top40ScoreCount = @TotalScoreCount * 0.20
SET @Top60ScoreCount = @TotalScoreCount * 0.20
SET @Top80ScoreCount = @TotalScoreCount * 0.20
SET @InterScoreCount = 0
--Cursor for Top 0-20 Percent
DECLARE MonetaryScoreTop20_Cursor CURSOR FOR
SELECT Email, MonetaryCount FROM RFMBase Order By MonetaryCount DESC;
SELECT @PrevScore = MAX(MonetaryCOunt) FROM RFMBase
OPEN MonetaryScoreTop20_Cursor
FETCH MonetaryScoreTop20_Cursor INTO @Email, @MonetaryCount
WHILE @@FETCH_STATUS = 0
BEGIN
```

| Frequency/Monetary Calculation: |
|---|

```
        SET @InterScoreCount = @InterScoreCount + @MonetaryCOunt
        IF (@InterScoreCount <= @Top20ScoreCount) OR (@MonetaryCount = @PrevScore)
        BEGIN
        UPDATE RFMBase
        Set MonetaryScore = 1 WHERE Email = @Email
        SET @PrevScore = @MonetaryCount
        END
FETCH MonetaryScoreTop20_Cursor INTO @Email, @MonetaryCount
END
SET @InterScoreCount = 0
CLOSE MonetaryScoreTop20_Cursor
DEALLOCATE MonetaryScoreTop20_Cursor
--Cursor for Top 20-40 Percent
DECLARE MonetaryScoreTop20to40_Cursor CURSOR FOR
SELECT Email, MonetaryCount FROM RFMBase WHERE MonetaryScore is NULL Order By
MonetaryCount DESC;
SELECT @PrevScore = MAX(MonetaryCount) FROM RFMBase WHERE MonetaryScore is
NULL
OPEN MonetaryScoreTop20to40_Cursor
FETCH MonetaryScoreTop20to40_Cursor INTO @Email, @MonetaryCount
WHILE @@FETCH_STATUS = 0
BEGIN
SET @InterScoreCount = @InterScoreCount + @MonetaryCount
        IF (@InterScoreCount <= @Top40ScoreCount) OR (@MonetaryCount = @PrevScore)
        BEGIN
        UPDATE RFMBase
        Set MonetaryScore = 2 WHERE Email = @Email
        SET @PrevScore = @MonetaryCount
        END
FETCH MonetaryScoreTop20to40_Cursor INTO @Email, @MonetaryCount
END
SET @InterScoreCount = 0
CLOSE MonetaryScoreTop20to40_Cursor
DEALLOCATE MonetaryScoreTop20to40_Cursor
SET @InterScoreCount = 0
--Cursor for Top 40-60 Percent
DECLARE MonetaryScoreTop40to60_Cursor CURSOR FOR
SELECT Email, MonetaryCount FROM RFMBase WHERE MonetaryScore is NULL Order By
MonetaryCount DESC;
SELECT @PrevScore = MAX(MonetaryCount) FROM RFMBase WHERE MonetaryScore is
NULL
OPEN MonetaryScoreTop40to60_Cursor
FETCH MonetaryScoreTop40to60_Cursor INTO @Email, @MonetaryCount
WHILE @@FETCH_STATUS = 0
BEGIN
SET @InterScoreCount = @InterScoreCount + @MonetaryCount
        IF (@InterScoreCount <= @Top60ScoreCount) OR (@MonetaryCount = @PrevScore)
        BEGIN
        UPDATE RFMBase
        Set MonetaryScore = 3 WHERE Email = @Email
        SET @PrevScore = @MonetaryCount
        END
FETCH MonetaryScoreTop40to60_Cursor INTO @Email, @MonetaryCount
END
SET @InterScoreCount = 0
CLOSE MonetaryScoreTop40to60_Cursor
DEALLOCATE MonetaryScoreTop40to60_Cursor
--Cursor for Top 60-80 Percent
DECLARE MonetaryScoreTop60to80_Cursor CURSOR FOR
SELECT Email, MonetaryCount FROM RFMBase WHERE MonetaryScore is NULL Order By
MonetaryCount DESC;
SELECT @PrevScore = MAX(MonetaryCount) FROM RFMBase WHERE MonetaryScore is
NULL
OPEN MonetaryScoreTop60to80_Cursor
FETCH MonetaryScoreTop60to80_Cursor INTO @Email, @MonetaryCount
WHILE @@FETCH_STATUS = 0
BEGIN
SET @InterScoreCount = @InterScoreCount + @MonetaryCount
        IF (@InterScoreCount <= @Top80ScoreCount) OR (@MonetaryCount = @PrevScore)
        BEGIN
        UPDATE RFMBase
        Set MonetaryScore = 4 WHERE Email = @Email
        SET @PrevScore = @MonetaryCount
        END
FETCH MonetaryScoreTop60to80_Cursor INTO @Email, @MonetaryCount
END
SET @InterScoreCount = 0
CLOSE MonetaryScoreTop60to80_Cursor
```

-continued

Frequency/Monetary Calculation:

```
DEALLOCATE MonetaryScoreTop60to80_Cursor
UPDATE RFMBase
SET MonetaryScore = 5 where MonetaryScore is NULL
Recency Score:
The Recency score is defined by the most recent purchase made by the customer. Scores range
from 1 to 6 with 1 being the maximum and 6 being the minimum.
Algorithm:
Update RFMBase
Set RecencyScore = 1
where DateDiff(d,RecentPurchased,CurrentDate) <= 30
Update RFMBase
Set RecencyScore = 2
where DateDiff(d,RecentPurchased,CurrentDate) > 30 and
DateDiff(d,RecentPurchased,CurrentDate) <= 60
Update RFMBase
Set RecencyScore = 3
where DateDiff(d,RecentPurchased,CurrentDate) > 60 and
DateDiff(d,RecentPurchased,CurrentDate) <= 90
Update RFMBase
Set RecencyScore = 4
where DateDiff(d,RecentPurchased,CurrentDate) > 90 and
DateDiff(d,RecentPurchased,CurrentDate) <= 180
Update RFMBase
Set RecencyScore = 5
where DateDiff(d,RecentPurchased,CurrentDate) > 180 and
DateDiff(d,RecentPurchased,CurrentDate) <= 365
Update RFMBase
Set RecencyScore = 6
where DateDiff(d,RecentPurchased,CurrentDate) > 365
```

Figure 7B:
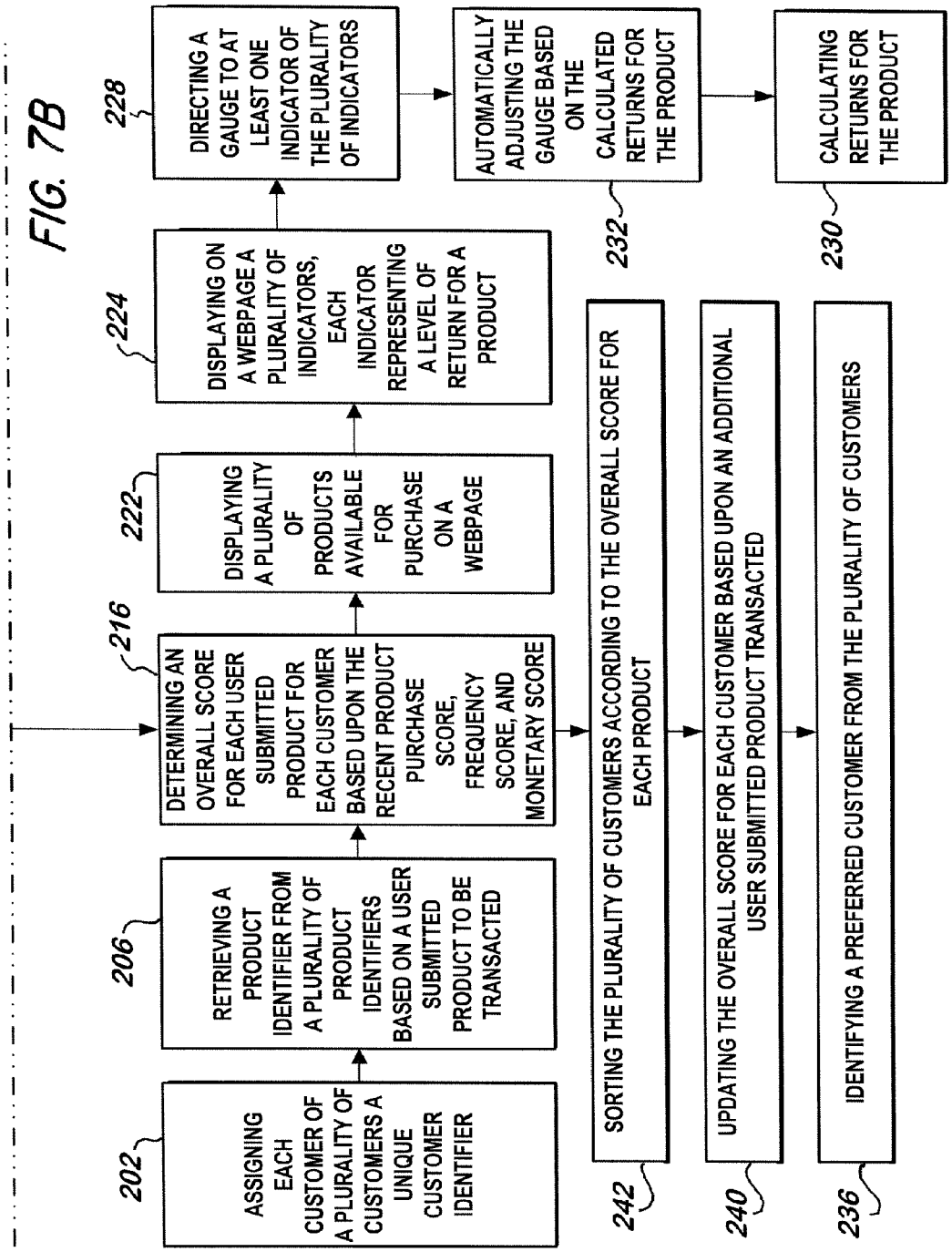
FIG. 7 depicts a method for providing the system shown in FIG. 1.

FIG. 7 depicts method 200 for indicating customer information for a plurality of customers, including the steps of assigning 202 each customer of a plurality of customers a unique customer identifier and retrieving 206 a product identifier from a plurality from a plurality of product identifiers based on a user submitted product to be transacted. Method 200 also includes determining 208 a most recent purchase of the user submitted product by each customer and, based upon when the most recent user submitted product was purchased, associating a recent product purchase score for each product identifier for each customer identifier; determining 210 a frequency of user submitted products purchased by each customer and, based upon how frequent user submitted products were purchased, associating a frequency score for each product identifier for each customer identifier; determining 212 an amount of money spent for user submitted products by each customer and, based upon an amount of money spent for user submitted products, associating a monetary score for each product identifier for each customer identifier; and determining 216 an overall score for each user submitted product for each customer based upon the recent product purchase score, frequency score, and monetary score.

In some embodiments, method 200 displays 222 a plurality of products available for purchase on a webpage. In some of these embodiments, method 200 also displays 224 on the webpage a plurality of indicators, each indicator representing a level of return for a product; directs 228 a gauge to at least one indicator of the plurality of indicators; calculates 230 returns for the product; and automatically adjusts 232 the gauge based on the calculated returns for the product.

In other embodiments, method 200 includes identifying 236 a preferred customer from the plurality of customers. In further embodiments, method 200 calculates 238 a starting point to commence adjustment of said gauge and commences gauge adjustment upon reaching the starting point and updates 240 the overall score for each customer based upon an additional user submitted product transacted. In another embodiment, method 200 sorts 242 the plurality of customers according to the overall score for each product.

What is claimed is:

1. A system for indicating return information for a product purchased by a plurality of customers on a webpage accessible by a customer, comprising:
   a computer;
   a graphical user interface that displays a webpage accessible by a customer for displaying a plurality of products available for purchase;
   software executing on said computer for displaying on said webpage to said customer a plurality of indicators, each indicator representing a possible level of return for a product;
   software executing on said computer for displaying on said webpage to said customer a graphical or diagrammatic gauge, said gauge directed to at least one indicator of the plurality of indicators as showing a calculated level of return for said product;
   software executing on said computer for calculating said calculated level of return for said product each time a return or purchase of said product is completed;
   software executing on said computer for automatically adjusting said graphical or diagrammatic gauge based on the calculated level of return for the product each time a return or purchase of said product is completed;
   software executing on said computer for determining an overall score for each customer of the plurality of customers who purchase products based on criteria comprising at least in part a recent product purchase score, a frequency score, and a monetary score;
   and wherein the software for determining the overall score operates in a back-end of said webpage.

2. The system according to claim 1, further comprising software executing on said computer for identifying a preferred customer from the plurality of customers.

3. The system according to claim 1, further comprising software executing on said computer for calculating a starting point, said starting point being a number, greater than two, of previous purchases of the product by the plurality of customers above which to commence adjustment and display of said gauge, and commencing gauge adjustment upon reaching the said starting point.

4. The system according to claim 1, further comprising:
   software executing on said computer for determining a most recent purchase of the user submitted product by each customer and, based upon when the most recent user submitted product was purchased, associating a recent product purchase score for each product identifier for each customer identifier;
   software executing on said computer for determining a frequency of user submitted products purchased by each customer and, based upon how frequent user submitted products were purchased, associating a frequency score for each product identifier for each customer identifier; and
   software executing on said computer for determining an amount of money spent for user submitted products by each customer and, based upon an amount of money spent for user submitted products, associating a monetary score for each product identifier for each customer identifier.

5. The system according to claim 1, further comprising software executing on said computer for updating the overall score for each customer based upon an additional user submitted product transacted.

6. The system according to claim 1, further comprising software executing on said computer for sorting the plurality of customers according to the overall score for each product.

7. A system for indicating return information for a product purchased by a plurality of customers to a webpage accessible by a customer, comprising:
   a computer;
   software executing on said computer for displaying on a webpage accessible to a customer a plurality of indicators, each indicator representing a possible level of returns for a product across a plurality of customers;
   software executing on said computer for displaying on said webpage to said customer a graphical or diagrammatic gauge directed to selecting at least one indicator of the plurality of indicators as indicating a calculated level of returns for the product across a plurality of customers;
   software executing on said computer for calculating a calculated level of returns for the product each time a return or purchase is completed; and
   software executing on said computer for automatically adjusting said graphical or diagrammatic gauge based on the calculated level of returns for the product.

8. The system according to claim 7, further comprising software executing on said computer for directing the gauge to at least another indicator of the plurality of indicators based on the calculated returns.

9. The system according to claim 8, further comprising software executing on said computer for incorporating at least one additional piece of return information selected from the list consisting of reasons for returns, number of returns for each reason, and percentage of returns for each product of a plurality of products into the calculated level of returns.

10. The system according to claim 7, further comprising software executing on said computer for calculating a starting number of purchases of the product, greater than two, above which to commence display and adjustment of the gauge, and commencing gauge adjustment upon reaching said number of purchases.

11. A method for indicating return information for a product purchased by a plurality of customers to a webpage accessible by a customer, comprising the steps of:
   displaying a plurality of products available for purchase on a webpage accessible by a customer;
   displaying on the webpage to a customer a plurality of indicators, each indicator representing a potential level of returns for a product across a plurality of customers;
   directing a graphical or diagrammatic gauge to indicate at least one indicator of the plurality of indicators as the calculated level of returns for said product;
   calculating a level of returns for the product each time a return or purchase of the product is completed; and
   automatically adjusting the graphical or diagrammatic gauge based on the calculated level of returns for the product.

12. The method according to claim 11, further comprising the steps of:
   calculating a starting number of purchases of the product across a plurality of customers at or above which to commence adjustment of said gauge, wherein the starting number of purchases is greater than two; and
   commencing gauge display and automatic adjustment upon reaching the starting number of purchases.

* * * * *